(12) United States Patent
Seino et al.

(10) Patent No.: US 7,888,648 B2
(45) Date of Patent: Feb. 15, 2011

(54) RADIOLOGICAL MEASUREMENT SYSTEM AND RADIOLOGICAL IMAGING SYSTEM

(75) Inventors: Tomoyuki Seino, Hitachi (JP); Takafumi Ishitsu, Hitachi (JP); Yuichiro Ueno, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 179 days.

(21) Appl. No.: 12/388,263

(22) Filed: Feb. 18, 2009

(65) Prior Publication Data
US 2009/0242780 A1 Oct. 1, 2009

(30) Foreign Application Priority Data
Mar. 31, 2008 (JP) .............................. 2008-090842

(51) Int. Cl.
*G01T 1/24* (2006.01)
(52) U.S. Cl. ................................. 250/370.01
(58) Field of Classification Search ........................ 250/370.01–370.15; 378/98.8
See application file for complete search history.

(56) References Cited

U.S. PATENT DOCUMENTS

| | | | |
|---|---|---|---|
| 5,852,296 A | 12/1998 | Tsukamoto et al. | |
| 6,323,490 B1* | 11/2001 | Ikeda et al. | 250/370.09 |
| 6,353,229 B1* | 3/2002 | Polischuk et al. | 250/370.14 |
| 2005/0017187 A1* | 1/2005 | Petrick et al. | 250/370.09 |
| 2006/0138336 A1 | 6/2006 | Seino et al. | |

FOREIGN PATENT DOCUMENTS

| | | |
|---|---|---|
| JP | 07-012947 | 1/1995 |
| JP | 10-10237 | 1/1998 |
| JP | 2004-125524 | 4/2004 |
| JP | 2004-138472 | 5/2004 |
| JP | 3938189 | 4/2007 |
| JP | 2007-304510 | 11/2007 |

OTHER PUBLICATIONS

IEEE Transaction on Nuclear Science, vol. 45, Issue 3, Part 1, pp. 428-432, 1998, doi:<10.1109/23.682421>.
Office Action in Japanese Patent Application No. 2008-090842, mailed Jan. 5, 2010.
C. Matsumoto et al., Performance of a New Schottky CdTe Detector for Hard X-Ray Spectroscopy, IEEE Transactions on Nuclear Science, vol. 45, No. 3, Jun. 1998, doi:<10.1109/23.682421>.

* cited by examiner

*Primary Examiner*—David P Porta
*Assistant Examiner*—Kiho Kim
(74) *Attorney, Agent, or Firm*—Brundidge & Stanger, P.C.

(57) ABSTRACT

A radiological measurement system protecting an amplifier from damage caused by a surge current, ensuring temporal continuity of measurement with a minimum dead time, and including a high voltage DC supply for applying a bias voltage to a radiation detector formed of semiconductor crystal, a controller for exercising on-off control on the bias voltage supplied from the high voltage DC supply, an amplifier, a protection circuit for protecting the amplifier from a surge current generated when the bias voltage is subjected to the on-off control, a control unit for preventing the surge current from flowing to the amplifier, and a switch provided in parallel with the protection circuit and controlled in operation state by the control unit, wherein the control unit controls the operation state of the switch in synchronism with the on-off control exercised by the control unit to prevent the surge current from flowing to the amplifier.

12 Claims, 6 Drawing Sheets

RADIOLOGICAL MEASUREMENT SYSTEM AND RADIOLOGICAL IMAGING SYSTEM

BACKGROUND OF THE INVENTION

The present invention relates to a radiological measurement system and a radiological imaging system.

As a detector in the radiological measurement system, there are an ionization chamber, a scintillation detector, a semiconductor detector, and a cumulative radiation monitor. They are used properly according to the use. If it is desired to obtain not only a dose of gamma rays or X-rays but also its energy information, then the semiconductor detector is typically used. If gamma rays or X-rays are incident on a semiconductor, then the gamma rays or X-rays undergo energy conversion and a large amount of carrier charges such as electrons or holes are generated and the charge quantity is proportional to energy of the gamma rays or X-rays. In other words, since the energy can be known by measuring the charge quantity, high precision measurement results are obtained.

In the scintillation detector as well, energy can be found by converting gamma rays or X-rays to light and then measuring the quantity of light with a photo-multiplier tube or a photo-diode in the same way. Since gamma rays or X-rays are converted to light once, however, it is difficult to obtain high precision energy information. In many cases, therefore, the above-described semiconductor detector is used exclusively.

As a material used as the semiconductor detector, silicon, germanium, cadmium telluride and cadmium zinc telluride are known. Silicon is a material which is used in ICs as well and which is best known. Since silicon is as small as 14 in atomic number and low in density, however, the probability that gamma rays or X-rays react in crystal is low and silicon is limited to low energy use such as elemental composition analyzers.

Germanium has a little large atomic number 32, large carrier mobility, and extremely fine energy discrimination ability (energy resolution), and germanium is used as detectors as well. Since germanium is as small as approximately 0.7 eV in band gap, however, its leakage current is large at the room temperature and germanium needs to be cooled to low temperatures in use.

Cadmium telluride and cadmium zinc telluride are approximately 1.4 eV in band gap and small in leak current even at the room temperature. Therefore, cadmium telluride and cadmium zinc telluride can be used suitably as a radiation detector. Furthermore, cadmium telluride and cadmium zinc telluride are as large as 50 in average atomic number and high in sensitivity to gamma rays or X-rays as well. Cadmium zinc telluride uses elements of three kinds, and it is difficult to obtain crystal with a high yield. However, cadmium telluride formed of elements of two kinds is a material which is comparatively good in yield and which has become possible to mass-produce in recent years.

Cadmium telluride is a material which is excellent as the radiation detector as described above. In general, a diode is formed of cadmium telluride and supplied with a reverse bias voltage in use.

A problem called polarization effect occurs when cadmium telluride is used. This is a phenomenon caused by continuing to apply a bias voltage continuously in order to conduct radiological measurement especially in a radiation detector using cadmium telluride for a diode. This is a phenomenon that the energy resolution is aggravated and the sensitivity is also lowered remarkably. Its cause is interpreted to be that carriers are trapped by crystalline defects and stored as space charges.

This is a phenomenon well known in handling the radiation detector which uses cadmium telluride as described in, for example, Non-Patent Document 1. This phenomenon is not so remarkable at the room temperature or below. If the room temperature is exceeded, this phenomenon advances in the order of several minutes to several tens minutes. The radiation detector is typically used in a place located near an electronic circuit such as a detected signal amplifier. Unless cooled, therefore, the temperature becomes a little higher than the room temperature. Conversely, unless the radiation detector is stable at a little higher temperature than the room temperature, it is difficult to use the radiation detector as a detector. If cooling is conducted, then the problem of the polarization effect can be avoided, but a different problem such as complication caused by a countermeasure against dewfall or a cooling mechanism occurs. Unless the radiation detector using cadmium telluride can be used without cooling, therefore, advantages also go down as compared with the case of germanium described earlier.

As a measure for avoiding the polarization effect besides cooling, a method of making the bias voltage zero temporarily is known. This can be implemented by using, for example, a method described in Patent Document 1. In Patent Document 1, however, a circuit is shown supposing that the bias voltage is changed in approximately several seconds. While the bias voltage is zero or changing, radiological measurement is not conducted (this time period is called dead time). As a result, a problem that continuity of the measurement is not kept is posed. If the dead time is at least several seconds, the continuity of the measurement is not kept. Therefore, a radiological measurement situation in which the discontinuity of the measurement is allowed becomes comparatively limitative. In other words, use for which the radiation detector can be used is limited unadvantageously.

As measurement conditions and a measure for shortening a time period required to make the bias voltage equal to zero, there are those disclosed in Patent Document 2. According to Patent Document 2, a sufficient effect is obtained for suppression of the polarization effect by setting the time period required to make the bias voltage zero equal to approximately 0.5 to 1.0 second and setting its space to approximately 5 minutes. Nevertheless, the time period over which the bias voltage is zero or changing occurs for approximately one second, and it can be said by no means that the time period is short.

Therefore, the present inventors studied how short the time period required to make the bias voltage zero can be made without exerting an influence upon the avoidance of the polarization effect. As a result, the present inventors have found that the time period over which the bias voltage is made zero can be made equal to approximately several milliseconds provided that the space between the time periods over each of which the bias voltage is made zero is set equal to approximately several tens seconds. If the dead time is approximately several milliseconds, then the time is sufficiently short and consequently the continuity of the measurement is not hampered in many apparatuses. For apparatuses using a radiation detector, such as the gamma camera, single photon emission CT apparatus (SPECT), positron emission CT apparatus (PET) and environment radiation monitoring system, the dead time of approximately several milliseconds is a sufficiently short time.

If the time period over which the bias voltage is made zero is the order of milliseconds, i.e., the bias voltage is turned on and off in the order of milliseconds, however, then a surge current flows and there is a fear that the surge current will enter an amplifier and damage the amplifier. However, this can be avoided by providing the well-known protection circuit using diodes or the like on an input side of the amplifier. If circuit elements are selected carefully while paying attention to capacitance of the diodes used in the protection circuit, then it is possible to protect the amplifier almost without causing degradation in performance such as energy resolution.

Patent Document 1: JP-A-2004-138472

Patent Document 2: JP-B-3938189 (corresponds to US2006/0138336)

Non-Patent Document 1: IEEE TRANSACTIONS ON NUCLEAR SCIENCE, VOL. 45, ISSUE 3, PART 1, PP. 428-432 (1998)

SUMMARY OF THE INVENTION

As described above, it is possible to prevent the surge current let flow by turning on and off the bias voltage in the order of milliseconds from entering the amplifier by providing the protection circuit on the input side of the amplifier. Thus, it is possible to protect the amplifier from damage caused by the surge current.

However, providing such a protection circuit poses a problem that a dead time which is far longer than the time period required to make the bias voltage zero occurs and the temporal continuity of the measurement is hampered. The reason is as follows: even if the above-described protection circuit is used, a charge quantity which is far greater than the ordinary radiological detected signal flows into the amplifier, and consequently the amplifier is brought into a saturated state and it takes a time period for the amplifier to restore from the saturated state.

This is a problem common to radiological measurement in the radiological measurement system and the radiological imaging system.

From such a viewpoint, an object of the present invention is to provide a radiological measurement system and a radiological imaging system capable of protecting the amplifier from damage caused by the surge current and ensuring the temporal continuity of the measurement with a minimum dead time.

As means for attaining the object, a radiological measurement system is a radiological measurement system including a radiation detector formed of semiconductor crystal, a high voltage DC supply for applying a bias voltage to the radiation detector, a controller provided between the radiation detector and the high voltage DC supply to exercise on-off control on the bias voltage supplied from the high voltage DC supply, an amplifier for amplifying a detected signal supplied from the radiation detector, and a protection circuit provided between the radiation detector and the amplifier to protect the amplifier from a surge current generated when the bias voltage is subjected to the on-off control. The radiological measurement system includes a control unit for preventing the surge current from flowing to the amplifier, and a switch provided in parallel with the protection circuit and controlled in operation state by the control unit. The control unit controls the operation state of the switch in synchronism with the on-off control exercised by the control unit to prevent the surge current from flowing to the amplifier. Over the time period during which the bias voltage is made zero, therefore, operation of an input to the amplifier can be stopped. Thus, it is possible to prevent the surge current from entering the amplifier and prevent the dead time from being caused by saturation.

According to the present invention, a radiological measurement system and a radiological imaging system capable of protecting the amplifier from damage caused by the surge current and ensuring the temporal continuity of the measurement with a minimum dead time are obtained.

Other objects, features and advantages of the invention will become apparent from the following description of the embodiments of the invention taken in conjunction with the accompanying drawings.

DETAILED DESCRIPTION OF THE EMBODIMENTS

Hereafter, embodiments of a radiological measurement system according to the present invention will be described in detail.

First Embodiment

Figure 1:
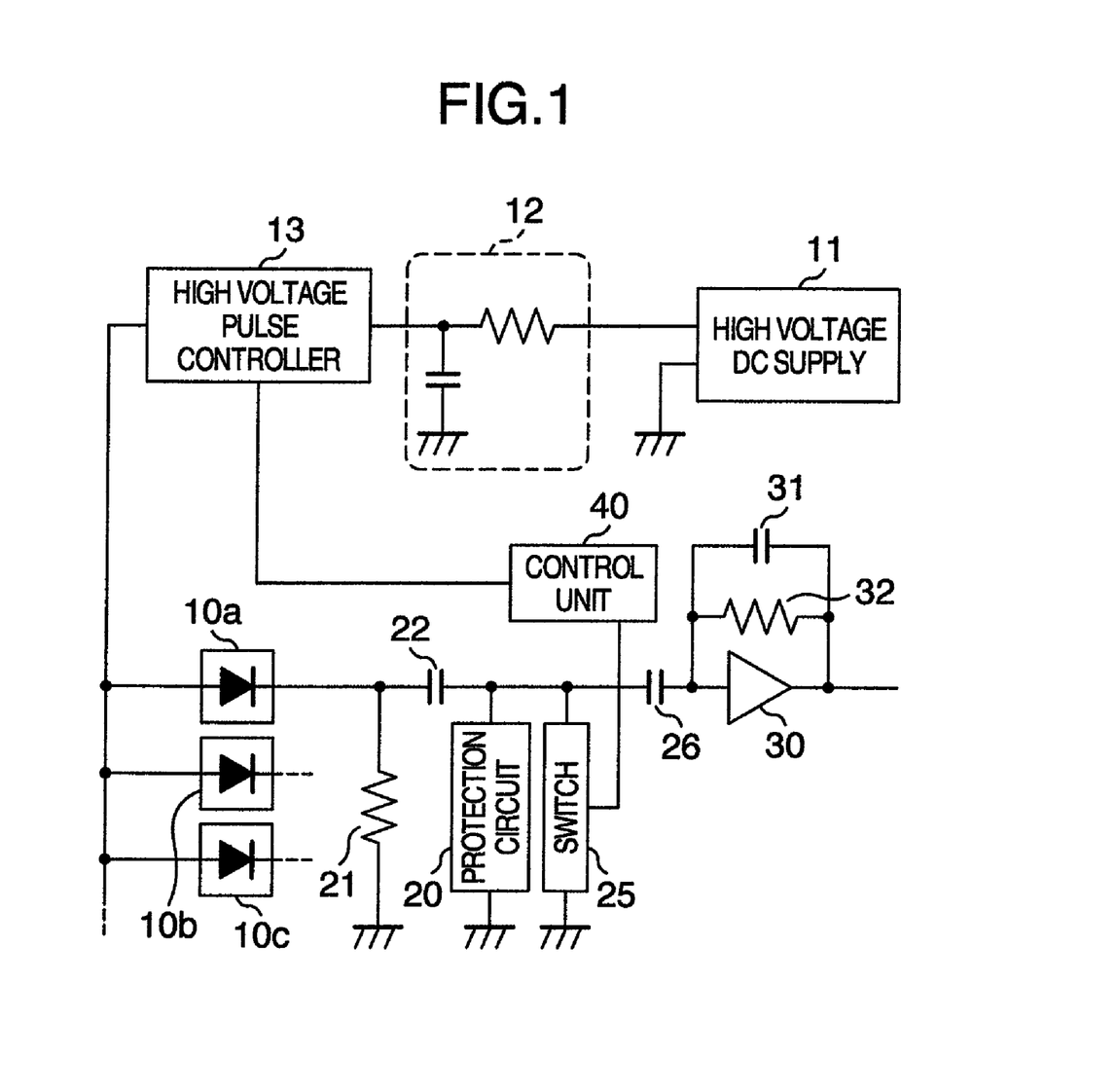
FIG. 1 is a circuit diagram showing a radiological measurement system according to a first embodiment of the present invention.

A radiological measurement system according to the present embodiment includes mainly radiation detectors $10a$ ($10b$, $10c$), a high voltage DC supply 11 serving as a power supply, a high voltage pulse controller 13 functioning as a controller, an amplifier 30, a protection circuit 20, a switch 25, and a control unit 40.

The radiological measurement system includes a plurality of radiation detectors $10a$, $10b$, $10c$ Each of them is connected on the downstream side of the high voltage pulse controller 13, and has a signal processing circuit such as the amplifier 30. In the ensuing description, a circuit connected to one radiation detector $10a$ is taken as an example.

In the radiation detector $10a$, a region which causes reaction with radiations and generates charges is formed of single crystal of semiconductor such as cadmium telluride. A pn junction diode is formed by using, for example, a cathode which has Pt as its principal component and an anode which has In as its principal component. A reverse bias voltage which has a negative polarity and which is DC (hereafter referred to simply as bias voltage) is applied from the high voltage DC supply to the radiation detector $10a$ via a noise filter 12 and the high voltage pulse controller 13. In other words, the radiation detector $10a$ is in a state equivalent to reverse bias of the diode. Unless radiations are absorbed in the radiation detector $10a$ itself, only a DC leak current flows barely. By the way, an ohmic junction or the like can be formed by changing joined materials.

If radiations are incident on the radiation detector 10a and trapped (absorbed), then charges (carriers) are generated in the radiation detector 10a and a pulse current signal of a charge quantity depending upon energy of radiations per photon of radiations flows as a detected signal. Since this detected signal is a high frequency pulse current, it passes through a capacitor 22 and a capacitor 26 and arrives at the amplifier 30.

The high voltage DC supply 11 is a power supply for applying the bias voltage to the radiation detector 10a. The high voltage DC supply 11 is connected to the cathode side of, for example, the radiation detector 10a via the noise filter 12 and the high voltage pulse controller 13.

The high voltage pulse controller 13 is provided between the radiation detector 10a and the high voltage DC supply 11. The high voltage pulse controller 13 plays a role of periodically exercising on-off control on the bias voltage supplied from the high voltage DC supply 11. The on-off control is exercised in response to a command given by the control unit 40. In the present embodiment, the time period over which the bias voltage is made zero is set equal to several milliseconds, and a time period over which the bias voltage is being changed, i.e., a dead time over which the measurement is interrupted is set to become a short time period. By the way, it is desirable that a time period required for the voltage to reach zero and a time period required for the voltage to restore from zero also become several milliseconds.

The protection circuit 20 protects the amplifier 30 from a comparatively large surge current generated by exercising on-off control on he bias voltage, and suppresses the surge current to a constant level. Specifically, the protection circuit 20 is formed by connecting two diodes having small capacitance in anti-parallel with each other, and it may be a well-known clamp circuit.

The surge current occurs when an abrupt voltage change (intermission of voltage) is given by on-off control exercised by the high voltage pulse controller 13 in a short time as described above. If the surge current is input to the amplifier 30 as it is, then there is a fear that the amplifier 30 will be destroyed as a result of saturation of the amplifier 30 or an abnormal rise of the input voltage.

The switch 25 is an on-off switch provided in parallel with the protection circuit 20. For example, a semiconductor switch such as an FET which has no mechanical contacts is used as the switch 25. The switch 25 is subject to on-off control in response to a command given by the control unit 40 and described later. The switch 25 is controlled to assume the on-state at the time of off-control of the bias voltage, and controlled to assume the off-state at the time of on-control of the bias voltage. Details of the control will be described later.

The control unit 40 controls the operation state of the switch 25 in synchronism with the on-off control exercised by the high voltage pulse controller 13. Specifically, at the time of off-control of the bias voltage exercised by the high voltage pulse controller 13, the control unit 40 controls the switch 25 to bring it into the on-state before the bias voltage is subjected to off-control. At the time of on-control of the bias voltage exercised by the high voltage pulse controller 13, i.e., at the time of control from the off-state to the on-state, the control unit 40 controls the switch 25 to be in the on-state before the bias voltage is subjected to on-control. In other words, whenever the bias voltage is subject to on-off control exercised by the high voltage pulse controller 13, the switch 25 is controlled to assume the on-state. As a result, the surge current generated when the bias voltage is subject to on-off control is grounded via the switch 25 brought into the on-state, and prevented from flowing toward the amplifier 30.

The amplifier 30 is a preamplifier for amplifying a detected signal supplied from the radiation detector 10a. The amplifier 30 is accompanied by a capacitor 31 and a resistor 32. An input side and an output side of the amplifier 30 are connected via the capacitor 31. An input pulse current signal is adapted to substantially charge the capacitor 31. In other words, the amplifier 30 forms an integration circuit by storing the pulse current signal across the capacitor 31. A charge quantity found by integrating the pulse current signal becomes an output signal of the amplifier 30. The resistor 32 plays a role of discharging charges stored across the capacitor 31. For example, in the case where radiations are absorbed by the radiation detector 10a one after another and charges are gradually stored across the capacitor 31, the stored charges are discharged. As a result, it is possible to prevent the voltage from continuing to rise.

A similar phenomenon also occurs on the capacitor 22 provided before the amplifier 30, and there is a fear that charges will be stored. In order to avoid this, therefore, a resistor 21 is provided to discharge the stored charges.

Figure 2:
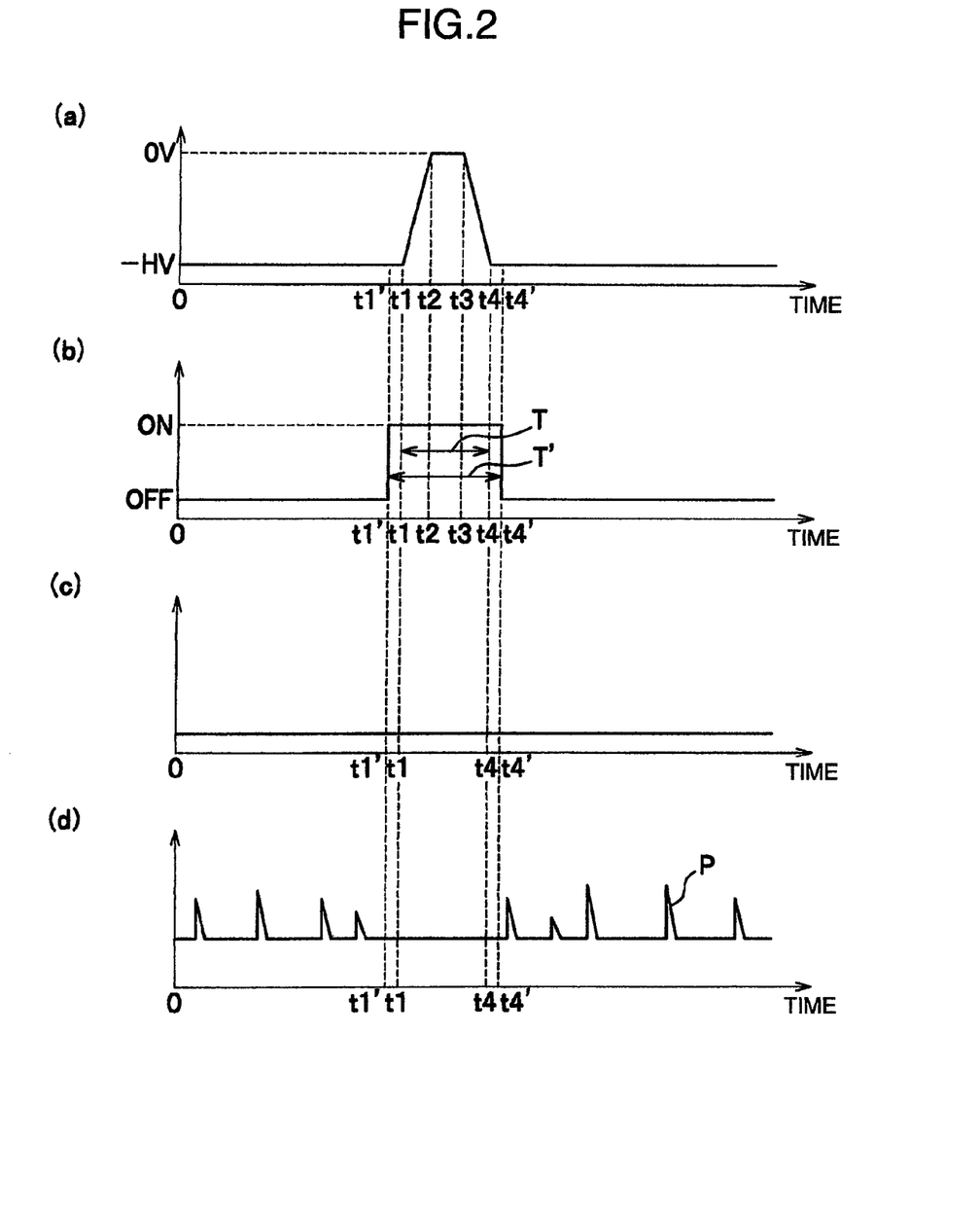
FIG. 2 is a time chart for explaining operation of the radiological measurement system according to the first embodiment of the present invention.

Operation of the radiological measurement system according to the present embodiment will now be with reference to FIG. 1 and a time chart shown in FIG. 2.

In the radiation detector 10a using cadmium telluride (see FIG. 1), the problem of the polarization effect occurs as described above. In order to suppress the polarization effect, therefore, it is necessary to conduct operation to make the bias voltage zero temporarily. A bias voltage of −HV (high volt) is applied to the radiation detector 10a. If the operation of making the bias voltage zero temporarily is conducted, then the bias voltage rises from −HV to zero (V) at time t2 as shown in FIG. 2(a).

FIG. 2(a) shows a waveform of the bias voltage output from the high voltage pulse controller 13. FIG. 2(b) shows a waveform of the command signal given to the switch 25 by the control unit 40. FIG. 2(c) shows a waveform of a voltage at the protection circuit 20. FIG. 2(d) shows an output waveform of the amplifier 30. When radiations are trapped, a pulse P is output as a detected signal.

When temporarily making the bias voltage zero as described above, a command to that effect is sent from the control unit 40 to the high voltage pulse controller 13 at time t1. Prior to sending the command to that effect, i.e., at time t1' which is several milliseconds earlier than the time t1 shown in FIG. 2(b), however, the control unit 40 sends a command to the switch 25 to shift it from the off-state to the on-state.

Thereupon, the switch 25 changes from the off-state to the on-state at the time t1'. At time t1 which is several milliseconds after the time t1', the command that the bias voltage should be made zero is sent from the control unit 40 to the high voltage pulse controller 13. As a result, the high voltage pulse controller 13 starts control for making the bias voltage zero at the time t1. The bias voltage changes to zero at time t2 which is several milliseconds after the time t1 as shown in FIG. 2(a).

When the bias voltage changes to zero thus abruptly, the surge current is generated. Since the switch 25 assumes the on-state to form a short-circuit, however, the whole of the surge current flows to the switch 25. As a result, the output of the amplifier 30 is kept at zero as shown in FIG. 2(c). At the time of ordinary measurement when the on-off control is not exercised, the protection circuit 20 and the switch 25 are intercepted from the viewpoint of DC by the capacitor 22 and the capacitor 26 and are at 0 V. Even if the switch 25 is short-circuited or opened, therefore, large additional noise is not generated at all.

Thereafter, at time t3, a command is sent from the control unit 40 to the high voltage pulse controller 13 to restore the bias voltage to −HV. As a result, the high voltage pulse controller 13 starts control to restore the bias voltage to −HV at the time t3. The bias voltage changes to −HV at time t4 which is several milliseconds later than the time t3 as shown in FIG. 2(*a*).

When the bias voltage changes to the original state thus abruptly, the surge current is generated. Since the switch 25 assumes the on-state to continue the short-circuit, however, the surge current almost flows to the switch 25 in this case as well. As a result, the output of the amplifier 30 is kept at zero over a time period between the time t3 and the time t4 as well as shown in FIG. 2(*c*).

At time t4' subsequent to a time lag which lasts for several milliseconds from the time t4, the control unit 40 sends a command to the switch 25 to shift it from the on-state to the off-state. Thereupon, the switch 25 changes from the on-state to the off-state at the time t4' and inputting to the amplifier 30 is resumed as shown in FIG. 2(*d*).

In other words, a dead time T' is, as shown in FIG. 2(*b*), a time period between time t1' and time t4' over which the switch 25 is brought into the on-state. The dead time T' can be made barely approximately several milliseconds longer than a time T over which the bias voltage is changed, i.e., a time period between the time t1 and the time t4.

At the time of measurement, the protection circuit 20 and the switch 25 are intercepted from the viewpoint of DC by the capacitor 22 and the capacitor 26 and are at 0 V. Even if the switch 25 is short-circuited or opened, therefore, large additional noise is not generated at all.

Figure 3:
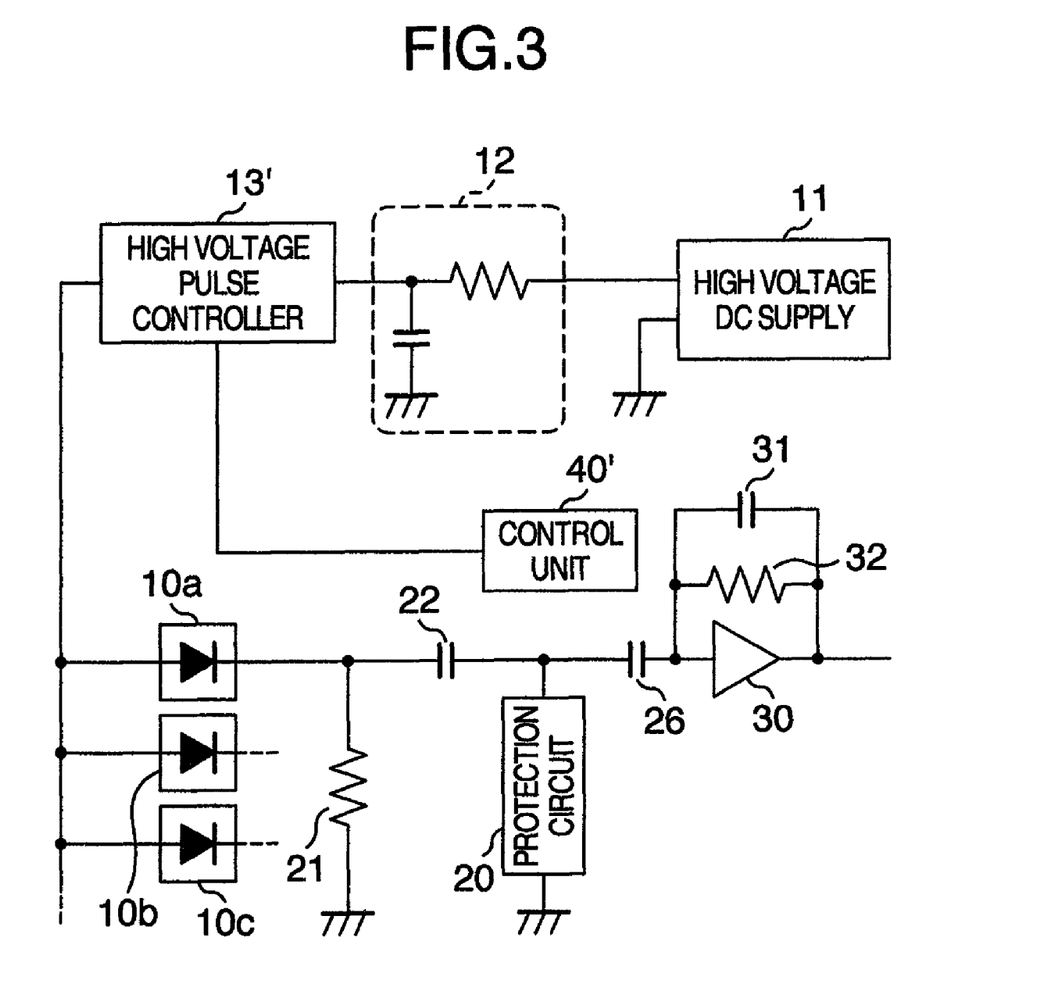
FIG. 3 is a circuit diagram showing a radiological measurement system according to a comparative example.

As a comparative example, a radiological measurement system which does not have the switch 25 is shown in FIG. 3, and its operation will now be described with reference to a time chart shown in FIG. 4.

Figure 4:
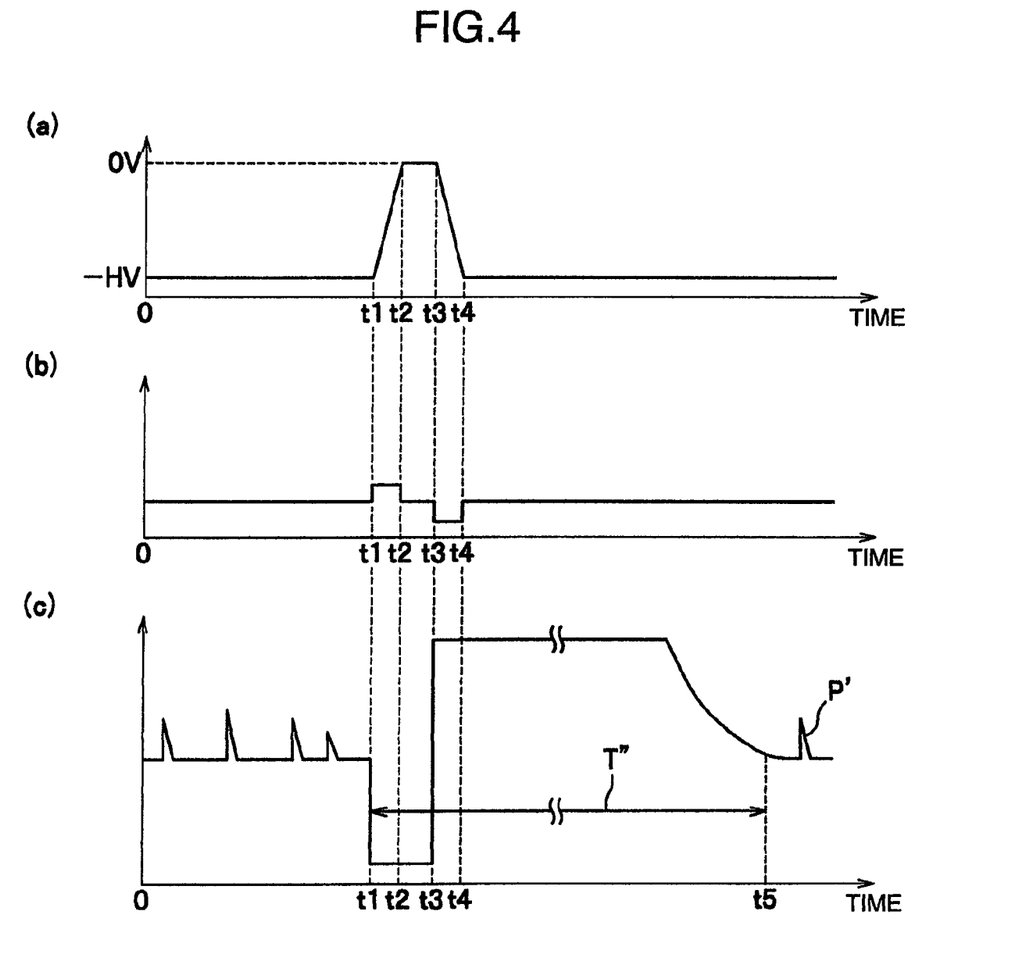
FIG. 4 is a time chart for explaining operation of the radiological measurement system according to the comparative example.

FIG. 4 shows signal waveforms at various points in FIG. 3. FIG. 4(*a*) shows a waveform of a bias voltage output from a high voltage pulse controller 13'. FIG. 4(*b*) shows a waveform of a voltage at the protection circuit 20. FIG. 4(*c*) shows an output waveform of the amplifier 30. When radiations are incident, a pulse P' is output as a signal.

When the waveform of the bias voltage which is output from the high voltage pulse controller 13' changes to zero at time t1 as shown in FIG. 4(*a*), a surge current is generated. Since the surge current is absorbed by the protection circuit 20, however, the voltage at the protection circuit 20 is kept low as shown in FIG. 4(*b*). As a result, the input voltage is prevented from rising abnormally and destruction of the amplifier 30 is avoided.

However, the amplifier 30 saturates at time t3 as described earlier. As a result, a time period between the time t3 and time t5 is needed for recovery. Roughly, several tens milliseconds are needed. Therefore, the dead time T" becomes a time period between the time t1 and time t5, and it becomes as extremely long as approximately several tens milliseconds. As a result, it becomes impossible to keep the temporal continuity of the measurement.

On the other hand, in the present embodiment, the dead time T' can be made barely approximately several milliseconds longer than the time T over which the bias voltage changes as described above, and it becomes possible to keep the temporal continuity of the measurement.

The radiological measurement system as heretofore described can be adopted suitably in the gamma camera, single photon emission CT apparatus (SPECT), positron emission CT apparatus (PET) and environment radiation monitoring system. An example in which the radiological measurement system is adopted in a radiological imaging system such as the PET will now be described with reference to FIG. 5.

Figure 5:
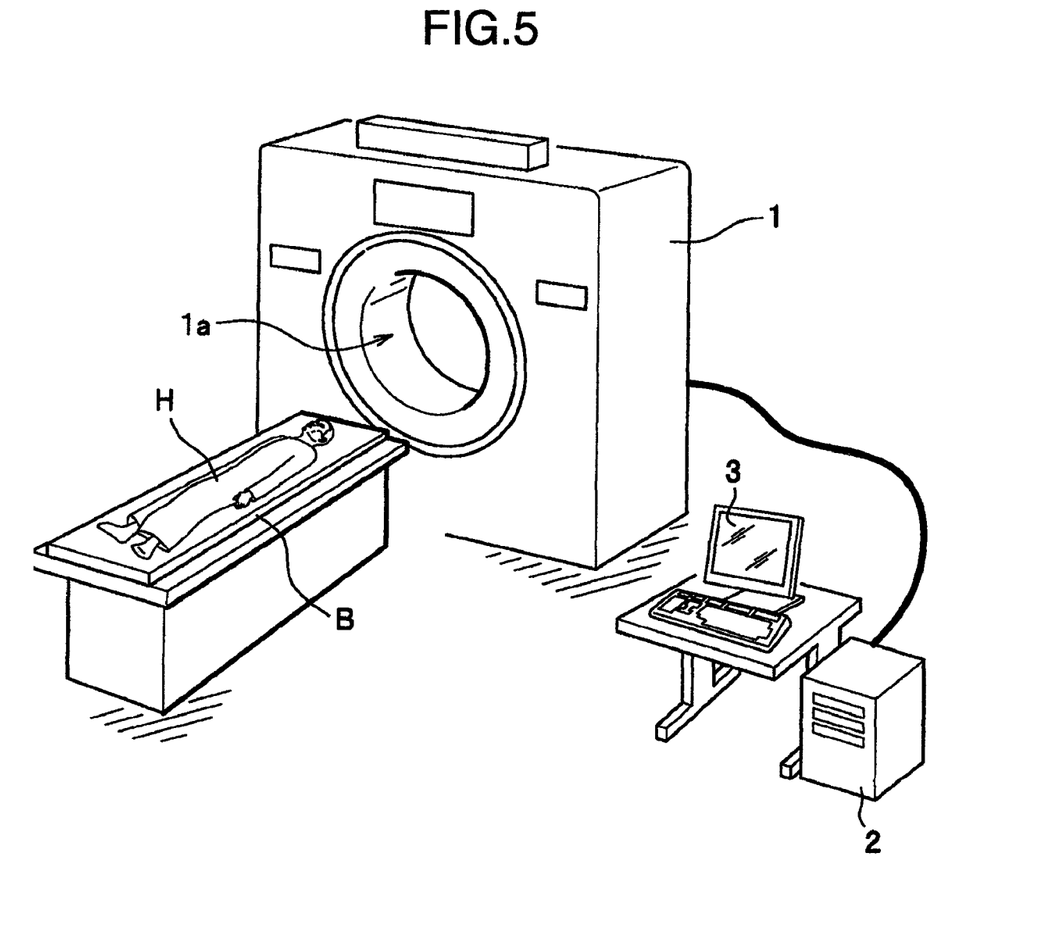
FIG. 5 is a schematic configuration diagram showing a radiological imaging system to which the radiological measurement system according to the first embodiment of the present invention is applied.

As shown in FIG. 5, the radiological imaging system includes an imaging system 1 having a measurement space 1*a* into which a bed B for supporting a subject (a medical examinee) H is to be inserted and a radiological measurement system, a data processing device (such as a computer) 2, and a display device 3. The subject H is placed on the bed B, and inserted into the measurement space 1*a*.

The imaging system 1 includes a large number of unit substrates which are arranged in the peripheral direction so as to surround the measurement space 1*a* and which are not illustrated. A large number of radiation detectors 10*a*, 10*b*, 10*c*... are disposed on the unit substrates. Each unit substrate has an integrated circuit for measuring a peak value and detection time of detected gamma rays, and the peak value and detection time of the detected gamma rays are measured. The integrated circuit includes a plurality of signal processing devices which conducts processing on a radiation detected signal.

In such a radiological imaging system, the dead time becomes short and substantially continuous measurement can be conducted. As a result, the dead time for eliminating the polarization which has been a weak point of the conventional art almost disappears, and a highly reliable radiological imaging system is implemented. This contributes to the reduction of the cost.

Hereafter, effects obtained in the present embodiment will be described.

(1) In the present embodiment, the switch 25 provided in parallel with the protection circuit 20, and the control unit 40 which controls the operation state of the switch 25 in synchronism with the on-off control exercised by the high voltage pulse controller 13 are included. Over the time period during which the bias voltage is made zero by the on-off control exercised by the high voltage pulse controller 13, therefore, the control unit 40 can control the switch 25 to bring it into the on-state and consequently the operation of the amplifier 30 can be stopped. Therefore, it is possible to prevent the surge current from entering the amplifier 30 and prevent the dead time from being caused by saturation. As a result, a radiological measurement system capable of protecting the amplifier 30 from damage due to the surge current and ensuring the temporal continuity of measurement with a minimum dead time is obtained.

(2) At the time of the off-control of the bias voltage, the control unit 40 exercises control so as to bring the switch 25 into the on-state and then exercise off-control on the bias voltage. At the time of the on-control of the bias voltage, the control unit 40 exercises control so as to exercise on-control on the bias voltage and then bring the switch 25 into the off-state. Over the time period during which the bias voltage is made zero, therefore, the switch 25 is positively brought into the on-state (short-circuit state). It is thus possible to positively prevent the surge current from entering the amplifier 30. As a result, a radiological measurement system capable of protecting the amplifier 30 from damage due to the surge current and ensuring the temporal continuity of measurement with a minimum dead time is obtained.

(3) Despite the configuration exercising the on-off control, it is not necessary to make the withstand voltage of the capacitors 22 and 26 high, and the capacitors having a low withstand voltage can be used as they are. With a minimum requisite additional configuration, therefore, a radiological measurement system which protects the existing amplifier 30 and which is excellent in radiation detection capability is obtained.

(4) With a minimum requisite additional configuration of providing the switch 25, the existing amplifier 30 can be protected. The switch 25 can be provided simply at a low cost. Especially in a radiological imaging system using several tens thousand to several hundreds thousand radiation detectors 10a, 10b, 10c . . . , addition of an expensive component brings about a remarkable cost increase as a whole. Therefore, the radiological imaging system according to the present embodiment which does not result in such a situation is useful.

In addition, a favorable energy resolution can be implemented, and a change of a wiring structure of unit substrates included in the radiological imaging system can also be made minimum.

(5) In the present embodiment, the effects (1) to (4) can be obtained by adding the switch 25 without doing anything to elements of the amplifier 30, the capacitor 31 and the resistor 32. In many cases, the amplifier 30, the capacitor 31 and the resistor 32 are used as a united amplifier system or used as a circuit in an IC or an LSI. In the present embodiment, the switch 25 can be added to them from the external. On the other hand, a method of providing a switch in parallel with the capacitor 31 is also conceivable. However, adding a circuit within an amplifier system of a minute signal brings about a risk that noise is generated newly. Even if noise entering from the control unit 40 should occur, a countermeasure against noise is easy in the present embodiment because the switch 25 is an external circuit.

(6) Since the radiation detector 10a formed of cadmium telluride having a high energy discrimination capability is used, accurate energy information can be obtained in measurement of radiations, above all gamma rays.

Second Embodiment

Figure 6:
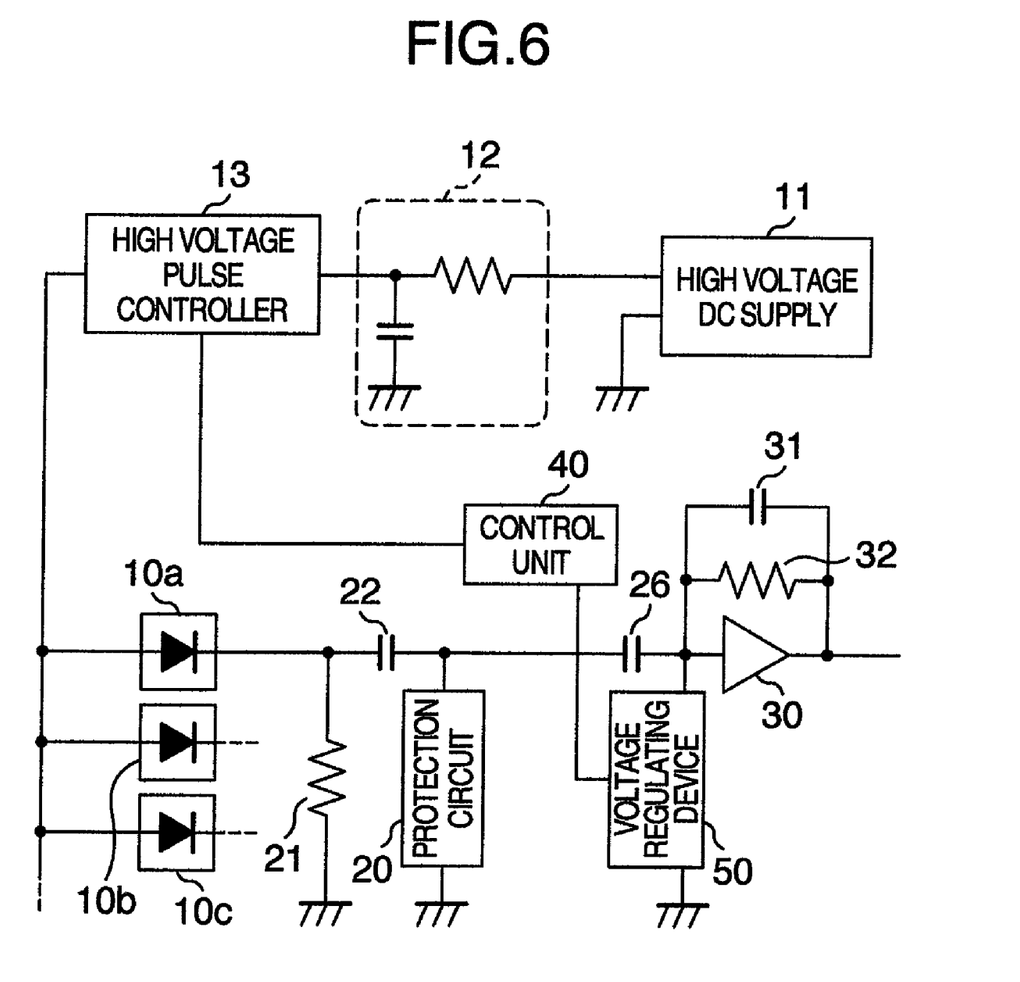
FIG. 6 is a circuit diagram showing a radiological measurement system according to a second embodiment of the present invention.

In a radiological measurement system according to a second embodiment, the switch 25 (see FIG. 1) is not provided in parallel with the protection circuit 20, but a voltage regulating device 50 which can be controlled in connection intermission by the control unit 40 is provided between the capacitor 26 and the amplifier 30 as shown in FIG. 6.

The voltage regulating device 50 is a device which can supply a constant voltage. The voltage regulating device 50 can be connected to the input side of the amplifier 30. Timing of the connection is the same as that in the case of the switch 25 (see FIG. 1) described in the first embodiment. In other words, at the time of the off-control of the bias voltage, the control unit 40 exercises control so as to bring the voltage regulating device 50 and the amplifier 30 into a connection state and then exercise off-control on the bias voltage. At the time of the on-control of the bias voltage, the control unit 40 exercises control so as to exercise on-control on the bias voltage and then bring the voltage regulating device 50 and the amplifier 30 into a disconnection state.

At the time of radiation measurement, the input side of the amplifier 30 is kept at a constant voltage which is not zero although the capacitor 31 is connected thereto. This aims at making the amplifier 30 operate when a signal from the radiation detector 10a is not present. Although the same voltage is maintained at the voltage regulating device 50 as well, the voltage regulating device 50 is in a state in which it is disconnected from the amplifier 30 at the time of radiation measurement.

At the time of on-off control of the bias voltage, the voltage regulating device 50 is connected to the input side of the amplifier 30 immediately before the high voltage pulse controller 13 exercises off control on the bias voltage, and is disconnected from the input side of the amplifier 30 immediately after restoration of the bias voltage is completed. Accordingly, the whole of a surge current caused at the time of an abrupt change of the bias voltage is absorbed by the voltage regulating device 50. As a result, the output of the amplifier 30 assumes utterly the same state as the output waveform shown in FIG. 2(c).

According to such a radiological measurement system, effects similar to the effects (1) to (6) described in the first embodiment are obtained.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. In a radiological measurement system including:
a radiation detector formed of semiconductor crystal;
a high voltage DC supply for applying a bias voltage to the radiation detector;
a controller provided between the radiation detector and the high voltage DC supply to exercise on-off control on the bias voltage supplied from the high voltage DC supply;
an amplifier for amplifying a detected signal supplied from the radiation detector; and
a protection circuit provided between the radiation detector and the amplifier to protect the amplifier from a surge current generated when the bias voltage is subjected to the on-off control,
the radiological measurement system comprising:
a control unit for preventing the surge current from flowing to the amplifier; and
a switch provided in parallel with the protection circuit and controlled in operation state by the control unit,
wherein
the control unit controls the operation state of the switch in synchronism with the on-off control exercised by the control unit to prevent the surge current from flowing to the amplifier.

2. The radiological measurement system according to claim 1, wherein
at time of off-control of the bias voltage, the control unit exercises control so as to bring the switch into an on-state and then exercises off-control on the bias voltage, and
at time of on-control of the bias voltage, the control unit exercises control so as to exercise on-control on the bias voltage and then bring the switch into an off-state.

3. A radiological imaging system comprising a radiological measurement system according to claim 2.

4. A radiological imaging system according to claim 3, wherein the semiconductor crystal comprises cadmium telluride.

5. A radiological imaging system comprising a radiological measurement system according to claim 1.

6. A radiological imaging system according to claim 5, wherein the semiconductor crystal comprises cadmium telluride.

7. In a radiological measurement system including:
a radiation detector formed of semiconductor crystal;
a high voltage DC supply for applying a bias voltage to the radiation detector;
a controller provided between the radiation detector and the high voltage DC supply to exercise on-off control on the bias voltage supplied from the high voltage DC supply;
an amplifier for amplifying a detected signal supplied from the radiation detector; and
a protection circuit provided between the radiation detector and the amplifier to protect the amplifier from a surge current generated when the bias voltage is subjected to the on-off control,
the radiological measurement system comprising:
a control unit for preventing the surge current from flowing to the amplifier; and
a voltage regulator circuit provided so as to be able to be electrically connected to an input side of the amplifier to apply a constant voltage to the amplifier at time of connection,
wherein
the control unit controls an electric connection state between the voltage regulator circuit and the amplifier in synchronism with the on-off control exercised by the control unit to prevent the surge current from flowing to the amplifier.

8. The radiological measurement system according to claim 7, wherein
at time of off-control of the bias voltage, the control unit exercises control so as to bring the voltage regulator and the amplifier into a connection state and then exercises off-control on the bias voltage, and
at time of on-control of the bias voltage, the control unit exercises control so as to exercise on-control on the bias voltage and then bring the voltage regulator and the amplifier into a disconnection state.

9. A radiological imaging system comprising a radiological measurement system according to claim 8.

10. A radiological imaging system according to claim 9, wherein the semiconductor crystal comprises cadmium telluride.

11. A radiological imaging system comprising a radiological measurement system according to claim 7.

12. A radiological imaging system according to claim 11, wherein the semiconductor crystal comprises cadmium telluride.

* * * * *